United States Patent
Gold

(10) Patent No.: US 9,061,482 B2
(45) Date of Patent: *Jun. 23, 2015

(54) FLEXIBLE CHAIR PAD

(75) Inventor: Darryl S. Gold, Chesterfield, MO (US)

(73) Assignee: GFH Enterprises, Inc., St. Louis, MO (US)

( * ) Notice: Subject to any disclaimer, the term of this patent is extended or adjusted under 35 U.S.C. 154(b) by 889 days.

This patent is subject to a terminal disclaimer.

(21) Appl. No.: 12/932,538

(22) Filed: Feb. 28, 2011

(65) Prior Publication Data

US 2011/0183136 A1 Jul. 28, 2011
US 2015/0132526 A9 May 14, 2015

Related U.S. Application Data

(63) Continuation-in-part of application No. 12/214,007, filed on Jun. 16, 2008, now abandoned, which is a continuation-in-part of application No. 10/905,827, filed on Jan. 21, 2005, now Pat. No. 7,402,536.

(51) Int. Cl.
*B32B 21/10* (2006.01)
*B32B 27/02* (2006.01)
(Continued)

(52) U.S. Cl.
CPC ............ *B32B 21/10* (2013.01); *A47G 27/0206* (2013.01); *B32B 9/02* (2013.01);
(Continued)

(58) Field of Classification Search
CPC ........ B32B 3/16; B32B 9/02; B32B 2250/03; B32B 2262/065; B32B 27/12; B32B 3/14; B32B 9/047; B32B 21/20; B32B 2471/00; B32B 2307/71; A47G 27/0206; D10B 2503/04; E04F 15/04; E04F 2203/08; E04F 2290/00

USPC .......... 442/2, 43, 45, 321, 323; 428/105, 107, 428/109, 114

See application file for complete search history.

(56) References Cited

U.S. PATENT DOCUMENTS

| 250,286 A | 11/1881 | Robbins et al. |
| 945,575 A | 1/1910 | McPherson |

(Continued)

FOREIGN PATENT DOCUMENTS

| CN | 1308160 | 8/2001 |
| CN | 1399011 | 2/2003 |

(Continued)

OTHER PUBLICATIONS

Natural Area Rugs; www.naturalarearugs.com/bamboo-rug.php, Internet Website; Dec. 2004; pp. 1 and 2; naturalarearugs.com.

(Continued)

*Primary Examiner* — Jenna Johnson
(74) *Attorney, Agent, or Firm* — Senniger Powers LLP

(57) ABSTRACT

A bamboo Chair pad that can be manufactured from 100% Anji Mountain bamboo from China. The bamboo is all treated with various protective coatings to add resistance to natural factors including water, sun and dirt. All bamboo chair pads can be manufactured from the harder portions of the bamboo trunk. (Some bamboo is manufactured from the softer fibers of the inside of the bamboo trunk). This portion of the bamboo trunk is not utilized for this invention. The bamboo utilized in the present inventions is taken from the harder part of the bamboo trunk to assure maximum endurance and longevity. The lower trunk portion of the bamboo plant is harder and less porous.

10 Claims, 2 Drawing Sheets

(51) Int. Cl.
  *A47G 27/00* (2006.01)
  *A47G 27/02* (2006.01)
  *B32B 9/02* (2006.01)
  *B32B 27/12* (2006.01)
  *B32B 27/34* (2006.01)
  *E04F 15/02* (2006.01)

(52) U.S. Cl.
  CPC .............. *B32B 27/02* (2013.01); *B32B 27/12* (2013.01); *B32B 27/34* (2013.01); *E04F 15/02* (2013.01); *E04F 2203/08* (2013.01); *E04F 2290/00* (2013.01)

(56) References Cited

U.S. PATENT DOCUMENTS

| | | | |
|---|---|---|---|
| 1,364,376 | A | 1/1921 | Isozaki |
| 1,659,141 | A | 2/1928 | Grupp |
| 1,984,046 | A | 12/1934 | Steiger |
| 2,168,696 | A | 8/1939 | Beck |
| 2,515,450 | A | 7/1950 | Hull |
| 2,696,181 | A | 12/1954 | Lacey |
| 2,713,012 | A | 7/1955 | Hartstein |
| 2,721,818 | A | 10/1955 | Dolnick et al. |
| 4,156,298 | A | 5/1979 | Spence |
| 4,301,207 | A | 11/1981 | Schomerus |
| 4,504,537 | A | 3/1985 | Mussallem, Jr. |
| 4,608,798 | A | 9/1986 | Spiers |
| 5,456,964 | A | 10/1995 | Tamura et al. |
| 5,567,256 | A | 10/1996 | Queen et al. |
| 5,652,038 | A | 7/1997 | Geren |
| 5,849,645 | A | 12/1998 | Lancaster |
| 5,916,105 | A | 6/1999 | Gow |
| 5,942,321 | A | 8/1999 | Romesberg et al. |
| 6,057,023 | A | 5/2000 | Shimono et al. |
| 6,103,333 | A | 8/2000 | Keith |
| 6,182,315 | B1 | 2/2001 | Lee |
| 6,228,433 | B1 | 5/2001 | Witt |
| 6,367,398 | B1 | 4/2002 | Landau |
| 6,383,652 | B1 | 5/2002 | Templeton et al. |
| 6,468,621 | B1 | 10/2002 | Landau |
| 6,720,057 | B1 | 4/2004 | Neumayr et al. |
| 7,225,591 | B2 | 6/2007 | Lin et al. |
| 7,361,616 | B2 | 4/2008 | Gold |
| 7,402,536 | B2 | 7/2008 | Gold |
| 2001/0046578 | A1 | 11/2001 | Frost |
| 2002/0155775 | A1 | 10/2002 | Capel |
| 2004/0161574 | A1 | 8/2004 | Hodgskiss |
| 2005/0053757 | A1 | 3/2005 | Andersen et al. |
| 2006/0165937 | A1 | 7/2006 | Gold |
| 2006/0165948 | A1 | 7/2006 | Gold |
| 2007/0087162 | A1 | 4/2007 | Mandawewala |
| 2008/0050520 | A1 | 2/2008 | Hubbuch et al. |
| 2008/0187710 | A1 | 8/2008 | Stanchfield et al. |
| 2011/0195219 | A1 | 8/2011 | Bell et al. |

FOREIGN PATENT DOCUMENTS

| | | |
|---|---|---|
| CN | 1560337 | 1/2005 |
| CN | 1584144 | 2/2005 |
| CN | 201094513 Y | 8/2008 |
| CN | 2010094514 Y | 8/2008 |
| CN | 101260588 A | 9/2008 |
| CN | 201404010 Y | 2/2010 |
| CN | 201452740 U | 5/2010 |
| CN | 101629343 | 7/2011 |
| JP | 401313012 A | 12/1989 |
| JP | 401320012 A | 12/1989 |
| JP | 2255112 A | 10/1990 |
| JP | 404106265 A | 4/1992 |
| JP | 09056612 A | 3/1997 |
| JP | 2002046392 A | 2/2002 |
| JP | 02003024205 A | 1/2003 |
| JP | 2006152503 A | 6/2006 |
| JP | 2008295626 A | 12/2008 |

OTHER PUBLICATIONS rugsusa.com inc; http://rugsusa.com/sisaljute.htm; Internet Website; Dec. 2004; pp. 1 and 2; rugsusa.com inc.

rugsusa.com inc; http://rugsusa.com/bamboorugs.htm; Internet Website; Dec. 2004; pp. 1 and 2; rugsusa.com inc.

Anji Huaxia Bamboo & Wood Products Co., Ltd.; www.hx-aj.com/product.htm; Internet Website; Dec. 2004; p. 6; E-mail: info@hx-aj.com.

Marjory L. Joseph, Introducing Textile Science, Chapter 21, Blends and Combination Yarns and Fabrics, 1986, Holt Rinehart and Winston, Fifth Ed., pp. 206-208.

Long-Jiao et al., Evaluation of Properties for Natural Bamboo Fiber for Application in Summer Textiles, Journal of Fiber Bioengineering and Informatics, vol. 3, No. 2, 2010, pp. 94-99.

FLEXIBLE CHAIR PAD

CROSS REFERENCE TO RELATED APPLICATION

This continuation-in-part patent application claims priority to the continuation-in-part patent application having Ser. No. 12/214,007, filed Jun. 16, 2008; which claims priority to the non-provisional patent application having Ser. No. 10/905,827, filed Jan. 21, 2005, which is now U.S. Pat. No. 7,402,536.

BACKGROUND OF THE INVENTION

This invention relates generally to chair pads and, more particularly, to wood chair pads. Chair pads are used as a protective covering for a floor area on which a chair rests or some other furniture item. The chair pad is utilized to protect the underlying floor from damage due to wear and tear caused by the chair and/or the occupant of the chair moving about within the floor area on which the chair rests. A typical chair pad is made of plastic or other appropriate material that is semi flexible, but resilient enough such that when the chair pad is placed on the floor area a semi rigid surface is provided by the chair pad. The semi rigid surface makes it easier to move about in the floor area with a chair with wheels.

Most chair pads are a unitary one piece flattened body. Some chair pads as indicated are made of plastic. However others are made of a hardwood material to provide a better aesthetic appeal. Hardwood chair pads, however, are not flexible. These chair pads, particularly largely ones, are difficult to move about and very difficult to ship because of the special packaging required. Also, one alternative to hardwood is bamboo, which can also be utilized for a chair pad if processed like a hardwood.

Bamboo is a grass, which belongs to the sub-family Bambusoidae of the family Poaceae (Graminae). Bamboo occurs naturally on every industrialized and populated continent with the exception of Europe. There are over 1000 known species of bamboo plants. It is a durable and versatile material, which has been utilized by various cultures and civilizations for various applications. Bamboo has been an integral part of the cultural, social and economic traditions of many societies. There is a vast pool of knowledge and skills related to the processing and usage of bamboo, which has encouraged the use of bamboo for various applications.

Clumping bamboo can be widely grown in tropical climates. The trunk of the plant is called the "culm". The culm is a wider at the trunk or bottom and narrows toward the top. In some varieties of bamboo the culm may grow 40 to 60 feet tall. Once established, bamboo plants can replenish themselves in two or three years. Each year a bamboo will put out several full length culms, which are generally hollow, in the form of a tube having "nodes". There are other parts of the bamboo plant that can be utilized other than the culm, including commonly used parts of a bamboo such as branches and leaves, culm sheaths, buds and rhizomes. Some species are very fast growing at the rate of one metre per day, in the growing season.

As mention above, bamboo occurs naturally on most continents, mainly in the tropical areas of a given continent. Its natural habitat ranges in latitude from Korea and Japan to South Argentina. It has been reported that millions tons of bamboo are harvested each year, almost three-fifths of it in India and China. On known source of quality bamboo is found in the Anji Mountains of China.

Bamboo has many uses such as substituting commercially for wood, plastics, and composite materials in structural and product applications. There is a large diversity of species, many of which are available in India, which is the second largest source of bamboo in the world ranking only behind China. These grow naturally at heights ranging from sea level to over 3500. Most Indian bamboo is sympodial (clump forming); the singular exception is *Phylostacchus bambuisodes*, cultivated by the Apa Tani Tribe on the Ziro plateau in Arunachal Pradesh.

Bamboo has to undergo certain processing stages to convert them into boards/laminates. The green bamboo culms are converted into slivers/planks and then to boards. The boards are finally finished by surface coating. The common primary processing steps for making sliver/planks from green bamboo culms are 1. Cross Cutting; 2. Radial Splitting; 3. Internal Knot Removing & Two-sided Planing; 4. Four-sided Planing; and 5. forming slivers/planks. The common secondary processing steps for making board/laminate from sliver/planks are 1. Starch Removal & Anti-fungal Treatment; 2. Drying; 3. Resin Application; 4. Laying of Slivers/planks; 5. Hot Pressing & Curing; and 6. form laminates/Boards. The common surface coating and finishing stages are 1. Surface Sanding & Finishing; 2. Surface Coating with melamine/polyurethane; 3. Curing of Laminates; 4. Fine Sanding; 5. Evaluation of Surface Properties.

There are various types of bamboo flooring including tongue and groove and the type that need to be butted together. The lacquered flooring tiles are finished using wear resistant UV lacquer and the unlacquered flooring tiles need to be coated/waxed and polished after installation. The strength of bamboo boards can be better than common wood board for its special Hi-steam pressure process. The board has good water resistance for its shrinking and expanding rate. Its water-absorbing rate is better than wood and is further humidity resistant and smooth. It has been reported that the strength of 12 mm bamboo ply-board is equivalent to that of a 25 mm plywood board. There are also removable bamboo flooring covering having bamboo on one side and carpeting on the other side. Although this type of flooring have limited flexibility.

There are also various types of bamboo chair pads made of flat elongated planks or strips arranged side by side length wise and attached along abutting adjacent edges binding them together in a side by die arrangement. There is also usually a cloth or felt backing or some other fibrous materials bonded to the underside. The bamboo chair pad as with any other wood chair pad is rigid.

The bamboo material is very durable for chair pad application, however, the construction of many bamboo pads are rigid lacking the capability to flex or bend. A novel bamboo chair pad construction is needed.

SUMMARY OF THE INVENTION

The invention is a hard wood chair pad formed from multiple elongated bamboo planks that have been processed like hardwood flooring. The chair pad provides a substantially hardwood rigid surface but the pad can be rolled up like a chair pad for ease of transport and shipping. The hardwood planks have sufficient thickness such that when they are bonded to a backing in an adjacent side by side manner a substantially rigid surface is provided. The planks are not adjacent connected along their side edges, therefore the pad can be rolled for ease of transport.

The bamboo chair pad can be manufactured from 100% Anji Mountain bamboo from China. The bamboo is all treated with various protective coatings to add resistance to natural factors including water, sun and dirt. All bamboo chair pads are made from the harder portions of the bamboo trunk. (Some bamboo used for indoor purposes are manufactured from the softer fibers of the inside of the bamboo trunk). This portion of the bamboo trunk is not utilized for this invention. The bamboo utilized in the present invention is taken from the harder part of the bamboo trunk to assure maximum endurance and longevity. The lower trunk portion of the bamboo plant is harder and less porous.

The bamboo for the present invention is kiln dried to prevent warping and remove moisture that can cause future warping. Certain styles of bamboo are oxidized in a boiling vat of liquid to bring out different variations of color versus the common method of spray staining the bamboo planks to a particular color. The oxidation process also makes the bamboo less porous to moisture. In addition, the planks will be carbonized, in addition to being oxidized, in that boiling vat of liquid, which not only brings out coloration, but also removes any insects from the bamboo slats. A UV coating can also be applied to the bamboo planks. One embodiment of the inventions can have 7 coats of UV protection. The UV protection can be obtained by applying several layers of polyurethane coatings, and said coatings are applied a number of successive times and have exposure to UV heat bulbs, to add to their curing. The bamboo can be arranged with a series of planks lying next to one another and then assembled into a chair pad utilizing the same manufacturing processes and machinery utilized for bamboo rugs. The chair pad can then be rolled or pressed thereby compressing the entire layer of the chair pad.

During the assembly process a mesh sheet is placed on the bottom side of the chair pad. The mesh sheet can be made of nylon fibers. The mesh sheet is a fibrous mesh sheet, and it may be formed of one of synthetic and natural fibers, in its construction. A mastic layer is then placed over the nylon mesh sheet before a final layer of high density felt or sisal is applied, which can be preferably about approximately 2 mm in thickness. Then the chair pads are cut to the desired dimensions.

After the bamboo planks are kiln dried, so as to prevent warping, and after their oxidizing and being carbonized in a boiling vat of liquid, the bamboo planks may be placed in humidity measured drying room for multiple days to assure even drying and to maintain a consistent moisture level in the bamboo planks, as used. In other words, the drying room lowers the moisture content, and consistently keeps the moisture content of the planks uniformly at that lower level.

Certain bamboo that can be used in the manufacture of the present bamboo chairpad is oxidized and gives it an extra step in making the bamboo more impermeable to water, sunlight and dirt. Once the elongated bamboo planks have been processed, they are adjacently aligned lengthwise, and side by side. A fibrous strip, or multiple threads and/or a fibrous tape material can be applied to the underside to connect the bamboo planks. A fiber mesh sheet can then be applied and bonded to the underside to hold the strips together. Then the porous mating is bonded to the underside. The present inventions construction provides a product that is easily packaged, transported, shipped and moved about to the flexibility of the chair pad and ability to roll up.

These and other advantageous features of the present invention will be in part apparent and in part pointed out herein below.

BRIEF DESCRIPTION OF THE DRAWINGS

For a better understanding of the present invention, reference may be made to the accompanying drawings in which.

DESCRIPTION OF THE PREFERRED EMBODIMENT

Figure 1:
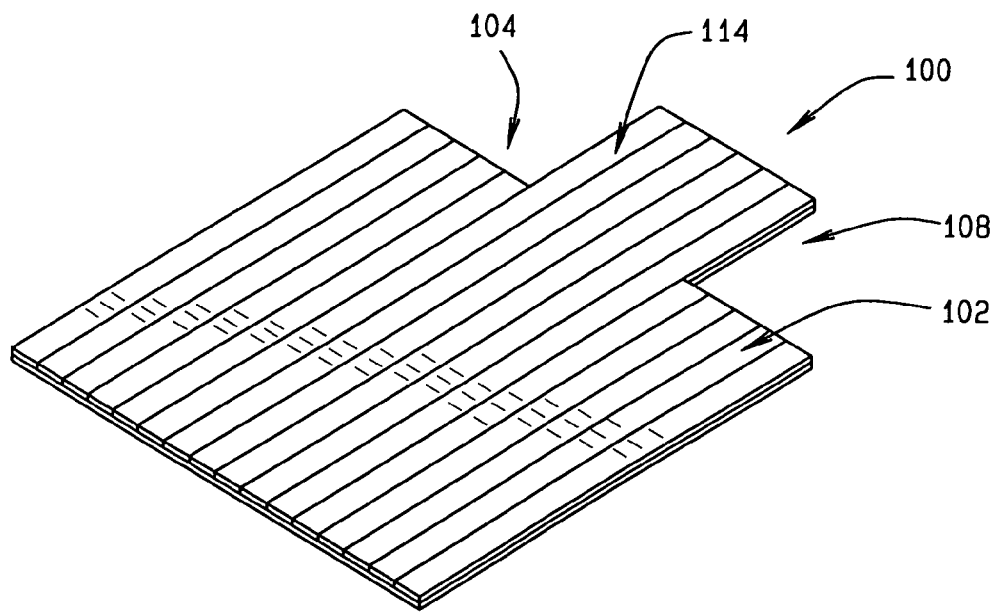
FIG. 1 is a perspective view of the chair pad.

According to the embodiment(s) of the present invention, various views are illustrated in FIGS. 1-5 and like reference numerals are being used consistently throughout to refer to like and corresponding parts of the invention for all of the various vies and figures of the drawing. Also, please note that the first digit(s) of the reference number for a given item or part of the invention should be correspond to the FIG. number in which the item or part is first identified.

One embodiment of the present invention comprising bamboo planks and a felt or sisal backing teaches a novel apparatus and method for a bamboo chair pad that is highly flexible along the plank seams for ease of rolling up.

The details of the invention and various embodiments can be better understood by referring to the figures of the drawing. Referring to FIG. 1, a perspective view of the present chair pad invention is shown. The chair pad construction include a plurality of elongated bamboo planks 102 arranged lengthwise in a side by side manner where the long side edge of each planks can abut against the adjacent long side edge of the adjacent planks. The abutting relationship between the planks can form a seam 114. The adjacent long side edges of adjacent planks can be unattached. The bamboo chair pad as shown is cut into a typical chair pad pattern outline that is a substantially rectangular outline with adjacent corner sections cut away. See the notched cutaway areas 104 and 106.

Figure 2:
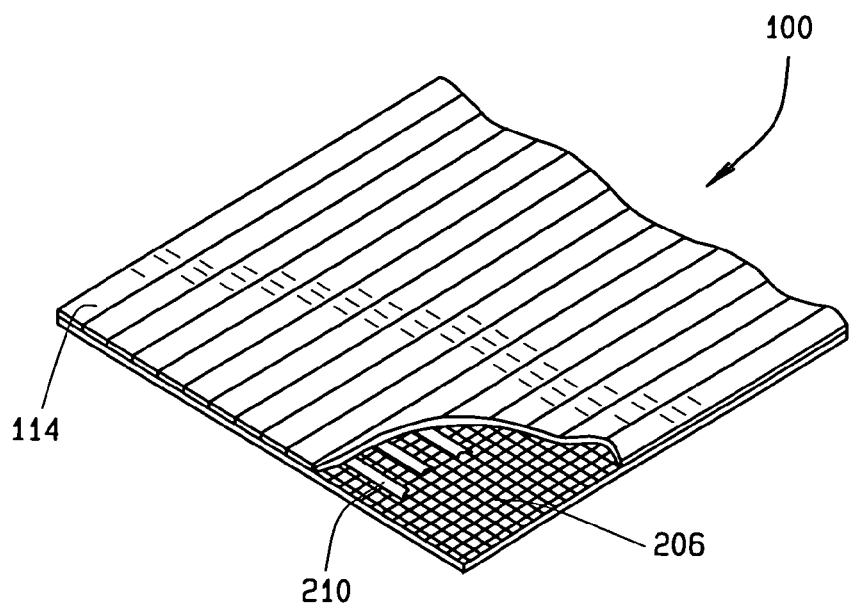
FIG. 2 is a perspective partial cut away view of the bamboo chair pad.

Referring to FIG. 2, the layers are shown assembled together forming the bamboo chair pad with a cut away revealing the liner layers. At least one fibrous tape strip extending orthogonally with respect to the lengthwise extension of the planks, see item 210 of FIG. 2, can be utilized to connect the plank together in an abutting relationship with each adjacent plank in system forming a chair pad. The fibrous tape strip can have some adhesive or adhesion properties on at least one facing surface of the tape strip such that it bonds to the underside of the planks to connect the adjacent planks together from the underside of the plank. The strip can extend edge to edge of the bamboo layer portion 304, see FIG. 3.

The rug as described herein can be such that the bamboo slats or planks are kiln dried to prevent warping. The bamboo planks or slats may also be carbonized in a boiling vat of liquid for use for coloring of the bamboo. This has a tendency to take out the sugars from the bamboo which prevents deterioration, and allows for its colorations. The chair pad as described can also be such that the bamboo slats are oxidize in a boiling vat of liquid for coloring the bamboo rather than performing a staining process. The chair pad as described can have a resin layer that is a mastic resin layer for sealing and moisture resistance. The chair pad invention as described herein can be such that the bamboo slats or planks or made of the harder lower trunk portions of the bamboo plant. The loom fiber such that the fibrous tape strip, can be a poly resin fiber.

Also, in lieu of the tape embodiment, the planks can be connected by a series of substantially parallel fibers having adhesive properties extending orthogonally with respect to the lengthwise extension of the planks. The connecting tape strips or fibers 210 can also extend in a crossing angular fashion with respect to the lengthwise extension of the seams 114. A fiber mesh sheet 206 can then be applied on the underside 308 of the bamboo layer portion 304, see FIG. 3. The mesh sheet further bonds the bamboo planks together. The chair pad as described herein can be such that the bamboo planks are kiln dried to prevent warping. The chair pad as described can also be such that the bamboo planks are oxidized in a boiling vat of liquid for coloring the bamboo rather than performing a staining process. The planks can vary in size; however one embodiment can have planks that are about approximately 5 mm thick and about approximately 5 cm wide. However, these dimensions can vary based on intended usage and preference. One embodiment of the chair pad can have planks with seven layers of UV protection and urethane coatings applied for mar and scuff resistance.

The chair pad, as described, can have a resin layer that is a mastic resin layer for sealing and moisture resistance. The chair pad invention as described herein can be such that the bamboo planks are made of the harder lower trunk portions of the bamboo plant. The fiber such as the fibrous tape strip can be a poly resin fiber. The fiber mesh sheet can also be a poly fiber mesh sheet.

All of these features provide significant flexibility. The construction of the layers bonded under the bamboo planks provides strength and durability as well as portability. The construction and the material contained in the construction described herein also provide substantial flexibility such that the chair pad can be easily rolled up.

Figure 3:
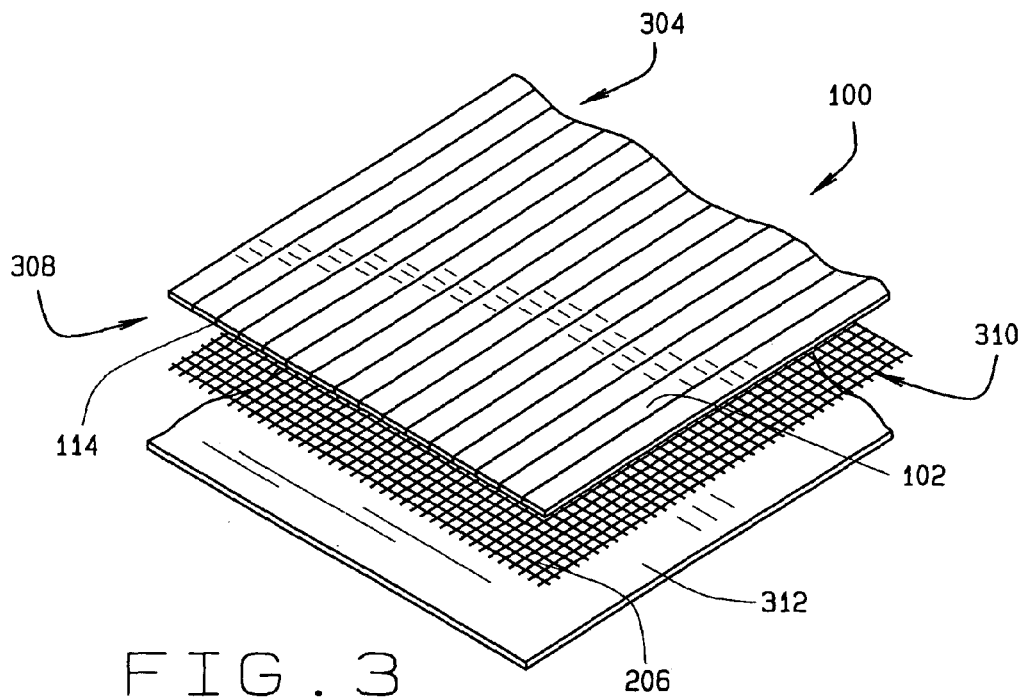
FIG. 3 is a perspective partial cut away exploded view of the chair pad layers.

Referring to FIG. 3, an exploded partial cut away view of the present invention's bamboo chair pad layers is shown. The chair pad 100 is shown and with the layers revealed in an exploded view. The chair pad 100 comprises a plurality of elongated flat bamboo planks 102 arranged lengthwise and side by side and each plank connected in a substantially abutting relationship with respect to an adjacent plank forming seams 114 between adjacent planks. The connected planks form the bamboo chair pad layer portion 304 (bamboo layer). The abutting long edges of adjacent planks can be unattached along the seams 114.

The adjacent planks can be connected to each other on the chair pad's bamboo layer underside 308 (the underside of the planks) by at least one fibrous tape strip extending orthogonally with respect to the lengthwise extension of the planks, see item 210 of FIG. 2 using the identified system for forming a chair pad. The loom fibrous tape strip can have some adhesive or adhesion properties on at least on facing surface of the tape strip such that it bonds to the underside of the planks to connect the adjacent planks together from the underside of the planks. The strip can extend orthogonally with respect to the lengthwise extension of the planks and can extend edge to edge of the bamboo layer portion 304.

Also, the planks can be connected by a series of substantially parallel fibers having adhesive properties extending orthogonally with respect to the lengthwise extension of the planks. The connecting tape strips or fibers 210 can also extend in a crossing angular fashion with respect to the lengthwise extension of the seams 114. A fiber mesh sheet 206 can then be applied on the underside 308 the bamboo layer portion 304. The mesh sheet further bonds the bamboo planks together. One embodiment of the mesh sheet can be a nylon mesh sheet.

A resin material layer applied to the fiber mesh sheet underside 310 bonding the mesh sheet to the underside 308 of the chair pad's bamboo layer 304. The resin material can be for example a mastic resin layer. The mastic resin layer will assist in providing a moisture seal for the underside of the chair pad for durability as well as bond the mesh sheet to the bamboo plank's underside 308. Then a high density layer 312 of matted natural or man made fiber is applied to the mesh sheet underside 310. The resin layer assists in bonding the high density fiber layer to the mesh underside. The high density layer can be moisture, mildew and skid resistant. The high density fiber layer can be made of matted sisal, felt, rubber, or polymer padding bonded under and to the resin material layer or the high density layer can be made of another appropriate fiber. One embodiment of the high density fiber layer can be about approximately 2 mm in thickness. However, the thickness of the high density fiber layer can vary significantly depending on the application and the environment for which the chair pad is to be used. Once the layers have been bonded, they can be pressed or rolled further compressing and bonding the layers together.

Figure 4:
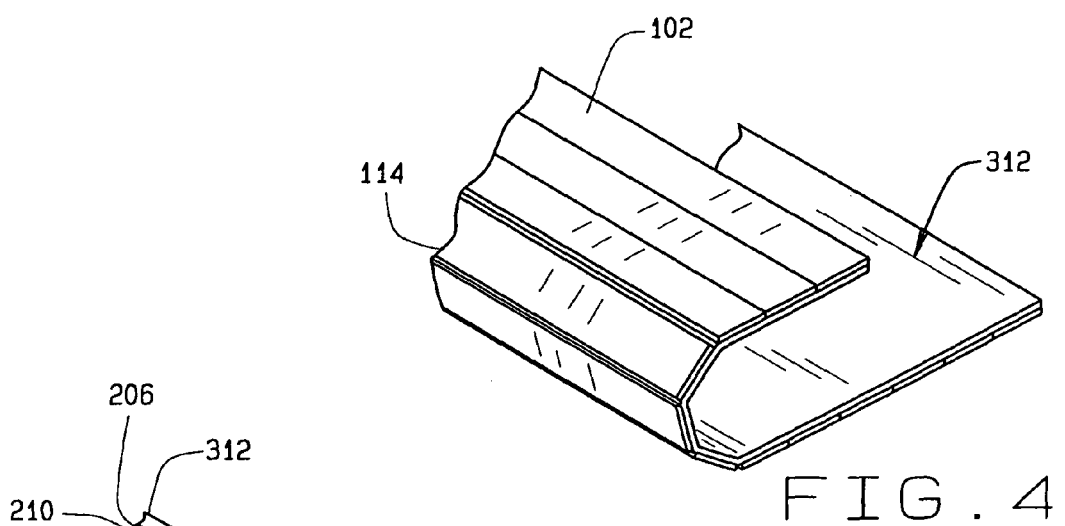
FIG. 4 is a perspective partial cut away view of the chair pad illustrating its flexibility.
Figure 5:
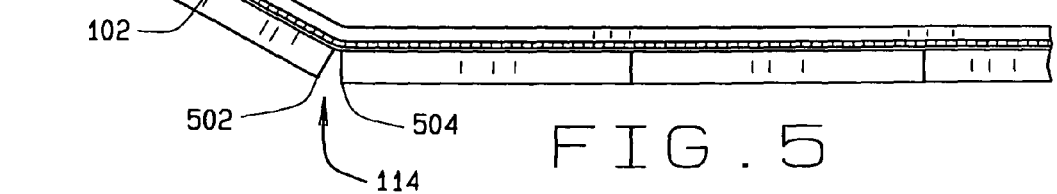
FIG. 5 is a partial end view of the chair pad.

Referring to FIGS. 4 and 5, a perspective partial cut away view of the chair pad illustrating its flexibility, and a partial end view of the chair pad is shown. The high density layer 312, the mesh layer 206, the tape 210, and the bamboo plank layer 102 are all shown in these views. The adjacent long side edges 502 and 504 of the planks 102 are shown unattached along the seams 114.

The various bamboo chair pad examples shown above illustrate a novel outdoor/indoor bamboo chair pad construction. A user of the present invention may choose any of the above bamboo chair pad construction embodiments, or an equivalent thereof, depending upon the desired application. In this regard, it is recognized that various forms of the subject outdoor/indoor bamboo chair pad could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

I claim:

1. A chair pad comprising:
    a plurality of elongated flat planks arranged lengthwise and side by side and each plank connected in a substantially abutting relationship with respect to an adjacent plank by at least one fibrous tape strip connected orthogonally to the said flat planks for forming a plank layer portion of the chair pad;
    a fiber mesh sheet applied on the underside of the plank layer portion of the chair pad;
    a bonding material layer applied to the fiber mesh sheet underside bonding the mesh sheet to the underside of the plank layer portion of the chair pad; and
    a skid resistant layer bonded over and to the bonding material layer.

2. The chair pad as set forth in claim 1 further comprising at least one tape strip bonded to the underside of at least some of the planks.

3. The chair pad as set forth in claim 1 wherein the elongated flat planks are made of bamboo.

4. The chair pad as set forth in claim 1 wherein the skid resistant layer is also moisture and mildew resistant.

5. The chair pad as set forth in claim 1 wherein the skid resistant layer is one of felt, cloth and sisal.

6. The chair pad as set forth in claim 1 wherein the skid resistant layer is a high density fiber layer.

7. The chair pad as set forth in claim 1 wherein the bonding material layer bonds the fiber mesh sheet and the skid resistant layer to the planks.

8. The chair pad as set forth in claim 7 wherein the bonding material layer is a resin.

9. The chair pad as set forth in claim 1 wherein the fiber mesh sheet is made of nylon.

10. A chair pad comprising:
- a plurality of elongated flat planks arranged lengthwise and side by side and each plank connected in a substantially abutting relationship with respect to an adjacent plank by at least one fibrous tape strip connected orthogonally to the said flat planks for forming a plank layer portion of the chair pad;
- a fiber mesh sheet applied on the underside of the plank layer portion of the chair pad;
- a bonding material layer applied to the fiber mesh sheet underside bonding the mesh sheet to the underside of the plank layer portion of the chair pad; and
- a high density layer bonded over and to the resin material layer, where the plank, tape, mesh and high density layer are pressure rolled for bonding.

\* \* \* \* \*